(12) United States Patent
Ueda et al.

(10) Patent No.: US 8,389,161 B2
(45) Date of Patent: *Mar. 5, 2013

(54) NONAQUEOUS ELECTROLYTE SECONDARY BATTERY AND METHOD FOR FABRICATING THE SAME

(75) Inventors: Atsushi Ueda, Osaka (JP); Yoshiyuki Muraoka, Osaka (JP)

(73) Assignee: Panasonic Corporation, Osaka (JP)

( * ) Notice: Subject to any disclaimer, the term of this patent is extended or adjusted under 35 U.S.C. 154(b) by 671 days.

This patent is subject to a terminal disclaimer.

(21) Appl. No.: 12/529,094

(22) PCT Filed: Jan. 22, 2009

(86) PCT No.: PCT/JP2009/000238
§ 371 (c)(1),
(2), (4) Date: Aug. 28, 2009

(87) PCT Pub. No.: WO2010/084526
PCT Pub. Date: Jul. 29, 2010

(65) Prior Publication Data
US 2011/0244323 A1    Oct. 6, 2011

(51) Int. Cl.
*H01M 4/64* (2006.01)
(52) U.S. Cl. .................... 429/233; 429/245
(58) Field of Classification Search ............. 429/233, 429/245
See application file for complete search history.

(56) References Cited

U.S. PATENT DOCUMENTS

| | | | |
|---|---|---|---|
| 2004/0072079 A1 | 4/2004 | Hashimoto et al. | |
| 2005/0244711 A1 | 11/2005 | Fukui et al. | |
| 2006/0105241 A1 | 5/2006 | Tode et al. | |
| 2006/0141341 A1* | 6/2006 | Nishino et al. | 429/62 |
| 2008/0124628 A1 | 5/2008 | Inoue et al. | |
| 2010/0068627 A1 | 3/2010 | Muraoka et al. | |

FOREIGN PATENT DOCUMENTS

| | | |
|---|---|---|
| JP | 05-182692 | 7/1993 |
| JP | 7-6752 | 1/1995 |
| JP | 9-115523 | 5/1997 |
| JP | 11-329447 | 11/1999 |
| JP | 2000-058127 | 2/2000 |
| JP | 2000-323124 | 11/2000 |
| JP | 2003-068284 | 3/2003 |
| JP | 2003-142106 | 5/2003 |
| JP | 2006-190691 * | 7/2005 |
| JP | 2006-134762 | 5/2006 |
| JP | 2006-164934 | 6/2006 |
| JP | 2008-135262 | 6/2006 |
| JP | 2006-190691 | 7/2006 |
| JP | 2008-186704 | 8/2008 |
| WO | WO 2009/019861 A1 | 2/2009 |

* cited by examiner

*Primary Examiner* — Laura Weiner
(74) *Attorney, Agent, or Firm* — McDermott Will & Emery LLP

(57) ABSTRACT

A nonaqueous electrolyte secondary battery includes a positive electrode 4 including a positive electrode current collector and a positive electrode mixture layer including a positive electrode active material and a binder, the positive electrode mixture layer being provided on the positive electrode current collector, a negative electrode 5, a porous insulating layer 6 interposed between the positive electrode 4 and the negative electrode 5, and a nonaqueous electrolyte. The tensile extension of the positive electrode 4 is equal to or higher than 3.0%. The charge end voltage in normal operation of the nonaqueous electrolyte secondary battery is equal to or higher than 4.3 V.

3 Claims, 2 Drawing Sheets

NONAQUEOUS ELECTROLYTE SECONDARY BATTERY AND METHOD FOR FABRICATING THE SAME

RELATED APPLICATIONS

This application is the U.S. National Phase under 35 U.S.C. §371 of International Application No. PCT/JP2009/000238, filed on Jan. 22, 2009, the disclosure of which Application is incorporated by reference herein.

TECHNICAL FIELD

The present disclosure relates to nonaqueous electrolyte secondary batteries and methods for fabricating the batteries, and particularly relates to a nonaqueous electrolyte secondary battery having a discharge end voltage of 4.3 V or higher and a method for fabricating such a battery.

BACKGROUND ART

Recent nonaqueous electrolyte secondary batteries utilized as main power supplies for mobile communication equipment and portable electronic equipment have high electromotive forces and high energy densities as their characteristics. Examples of material for a positive electrode active material used in the nonaqueous electrolyte secondary batteries include lithium transition metal composite oxides, such as lithium cobalt oxide ($LiCoO_2$), lithium nickel oxide ($LiNiO_2$), and the like, for example.

In the nonaqueous electrolyte secondary batteries (i.e., lithium ion secondary batteries) using a positive electrode active material containing a lithium transition metal composite oxide, an increase in charge end voltage has been examined. The term, "charge end voltage" herein means a maximum value of the charge voltage at which a battery can charge up safely. This enables provision of high-capacity nonaqueous electrolyte secondary batteries.

In view of this, in the nonaqueous electrolyte secondary batteries, the use of a positive electrode active material, in which two kinds of lithium transition metal composite oxides are mixed as a positive electrode active material, has been proposed (see, for example, Patent Document 1). This attempts to increase the charge end voltage (4.3 V or higher, for example) without lowering charge/discharge cycle characteristics and thermal stability.

Patent Document 1 concludes that a factor that contributes to lowering of the charge/discharge cycle characteristics (i.e., a factor that contributes to a decrease in battery capacity in association with repetition of a charge/discharge cycle) in a nonaqueous electrolyte secondary battery using a positive electrode active material containing $LiCoO_2$ and having an increased charge end voltage of 4.3 V or higher might be decomposition of a nonaqueous electrolyte or breakage of the crystal structure of $LiCoO_2$.

In view of this, the technique disclosed in Patent Document 1 uses a lithium transition metal composite oxide of $LiCoO_2$ containing at least both Zr and Mg as one of the two kinds of lithium transition metal composite oxides of the positive electrode active material in which the lithium transition metal composite oxides are mixed. By doing so, decomposition of the nonaqueous electrolyte or breakage of the crystal structure of $LiCoO_2$ is decreased as an attempt to prevent lowering of the charge/discharge cycle characteristics. Further, a lithium transition metal composite oxide having high thermal stability is used as the other lithium transition metal composite oxide. This may prevent lowering of thermal stability.

Patent Document 1: Japanese Unexamined Patent Application Publication No. 2006-164934
Patent Document 2: Japanese Unexamined Patent Application Publication No. 5-182692

SUMMARY

Problems that the Invention is to Solve

However, mere taking measures to prevent lowering of the charge/discharge cycle characteristics with respect to the positive electrode active material, in other words, only use of the lithium transition metal composite oxide of $LiCoO_2$ containing at least both Zr and Mg as one of the lithium transition metal composite oxides cannot sufficiently prevent lowering of the charge/discharge cycle characteristics.

In view of the foregoing, an objective of the present invention is to prevent lowering of the charge/discharge cycle characteristics in a nonaqueous electrolyte secondary battery having an increased charge end voltage of 4.3 V or higher.

Means for Solving the Problems

To attain the above objective, a nonaqueous electrolyte secondary battery in accordance with the present invention includes: a positive electrode including a positive electrode current collector and a positive electrode mixture layer including a positive electrode active material and a binder, the positive electrode mixture layer being provided on the positive electrode current collector; a negative electrode; a porous insulating layer interposed between the positive electrode and the negative electrode; and a nonaqueous electrolyte, wherein a tensile extension of the positive electrode is equal to or higher than 3.0%, and a charge end voltage in normal operation is equal to or higher than 4.3 V.

In the nonaqueous electrolyte secondary battery in accordance with the present invention, the tensile extension of the positive electrode is increased to 3.0% or more. Accordingly, repetition of a charge/discharge cycle cannot cause a cross-sectional shape of the positive electrode to become wavy. Hence, the distance between the positive electrode and the negative electrode can be kept uniformly over the entire region to uniform a charge/discharge reaction. This can cause no decrease in battery capacity even if the charge/discharge cycle is repeated, with a result that lowering of the charge/discharge cycle characteristics can be prevented.

Further, since a positive electrode having a tensile extension increased to 3.0% or more is used as a positive electrode, even when the battery is destroyed by crush, the positive electrode is not broken first, thus suppressing occurrence of a short circuit in the battery.

Particularly, upon occurrence of a short circuit in a battery, thermal energy generated at the short circuit increases as the charge end voltage is increased, thereby increasing a possibility of excessive heating. Specifically, since the thermal energy generated at a short circuit in a battery having a charge end voltage of 4.3 V or higher is greater than that in a general battery (for example, a battery having a charge end voltage of 4.2 V), the possibility of excessive heating is high. For this reason, prevention of occurrence of a short circuit in a battery having a charge end voltage of 4.3 V or higher can significantly reduce the possibility of excessive heating.

In the nonaqueous electrolyte secondary battery in accordance with the present invention, it is preferable that a tensile extension of the negative electrode is equal to or higher than 3.0%, and a tensile extension of the porous insulating layer is equal to or higher than 3.0%.

In the nonaqueous electrolyte secondary battery in accordance with the present invention, preferably, the positive electrode is obtained by rolling and then performing heat treatment at a predetermined temperature on the positive electrode current collector, where positive electrode material mixture slurry containing the positive electrode active material is applied to the positive electrode current collector and is dried.

In the nonaqueous electrolyte secondary battery in accordance with the present invention, the positive electrode current collector preferably contains iron, and mainly contains aluminum.

This can suppress covering of the positive electrode active material by the binder melted in the heat treatment performed after rolling.

In the nonaqueous electrolyte secondary battery in accordance with the present invention, a content of the iron contained in the positive electrode current collector is preferably equal to or higher than 1.20 wt % and equal to or lower than 1.70 wt %.

To attain the above objective, a method for fabricating a nonaqueous electrolyte secondary battery in accordance with the present invention is a method for fabricating a nonaqueous electrolyte secondary battery including a positive electrode including a positive electrode including a positive electrode current collector and a positive electrode mixture layer including a positive electrode active material and a binder, the positive electrode mixture layer being provided on the positive electrode current collector; a negative electrode; a porous insulating layer interposed between the positive electrode and the negative electrode; and a nonaqueous electrolyte, the method including: a step (a) of preparing the positive electrode; a step (b) of preparing the negative electrode; and a step (c) of winding or stacking the positive electrode and the negative electrode with the porous insulating layer interposed between the positive electrode and the negative electrode after the step (a) and the step (b), wherein the step (a) includes: (a1) coating the positive electrode current collector with positive electrode material mixture slurry containing the positive electrode active material and the binder, and drying the slurry; (a2) rolling the positive electrode current collector coated with the dried positive electrode material mixture slurry; and (a3) subjecting the positive electrode current collector coated with the dried positive electrode material mixture slurry to heat treatment at a predetermined temperature after the step (a2), a tensile extension of the positive electrode is equal to or higher than 3.0%, and a charge end voltage in normal operation is equal to or higher than 4.3 V.

According to the method for fabricating a nonaqueous electrolyte secondary battery in accordance with the present invention, the heat treatment performed after rolling can increase the tensile extension of the positive electrode to 3.0% or more.

In the method for fabricating a nonaqueous electrolyte secondary battery in accordance with the present invention, the predetermined temperature preferably is higher than a softening temperature of the positive electrode current collector.

In the method for fabricating a nonaqueous electrolyte secondary battery in accordance with the present invention, the positive electrode current collector preferably contains iron, and mainly contains aluminum.

This can reduce the temperature of the heat treatment necessary for increasing the tensile extension of the positive electrode to 3.0% or more and/or the time period of the heat treatment necessary for increasing the tensile extension of the positive electrode to 3.0% or more. Hence, the positive electrode active material can be prevented from being covered with the binder melted in the heat treatment performed after rolling.

Advantages of Invention

In the nonaqueous electrolyte secondary battery and the method for fabricating it in accordance with the present invention, the tensile extension of the positive electrode is increased to 3.0% or more. Accordingly, repetition of a charge/discharge cycle cannot cause a cross-sectional shape of the positive electrode to become wavy. Hence, the distance between the positive electrode and the negative electrode can be kept uniformly over the entire region to uniform a charge/discharge reaction. This can cause no decrease in battery capacity even if the charge/discharge cycle is repeated, with a result that lowering of the charge/discharge cycle characteristics can be prevented.

Figure 1:
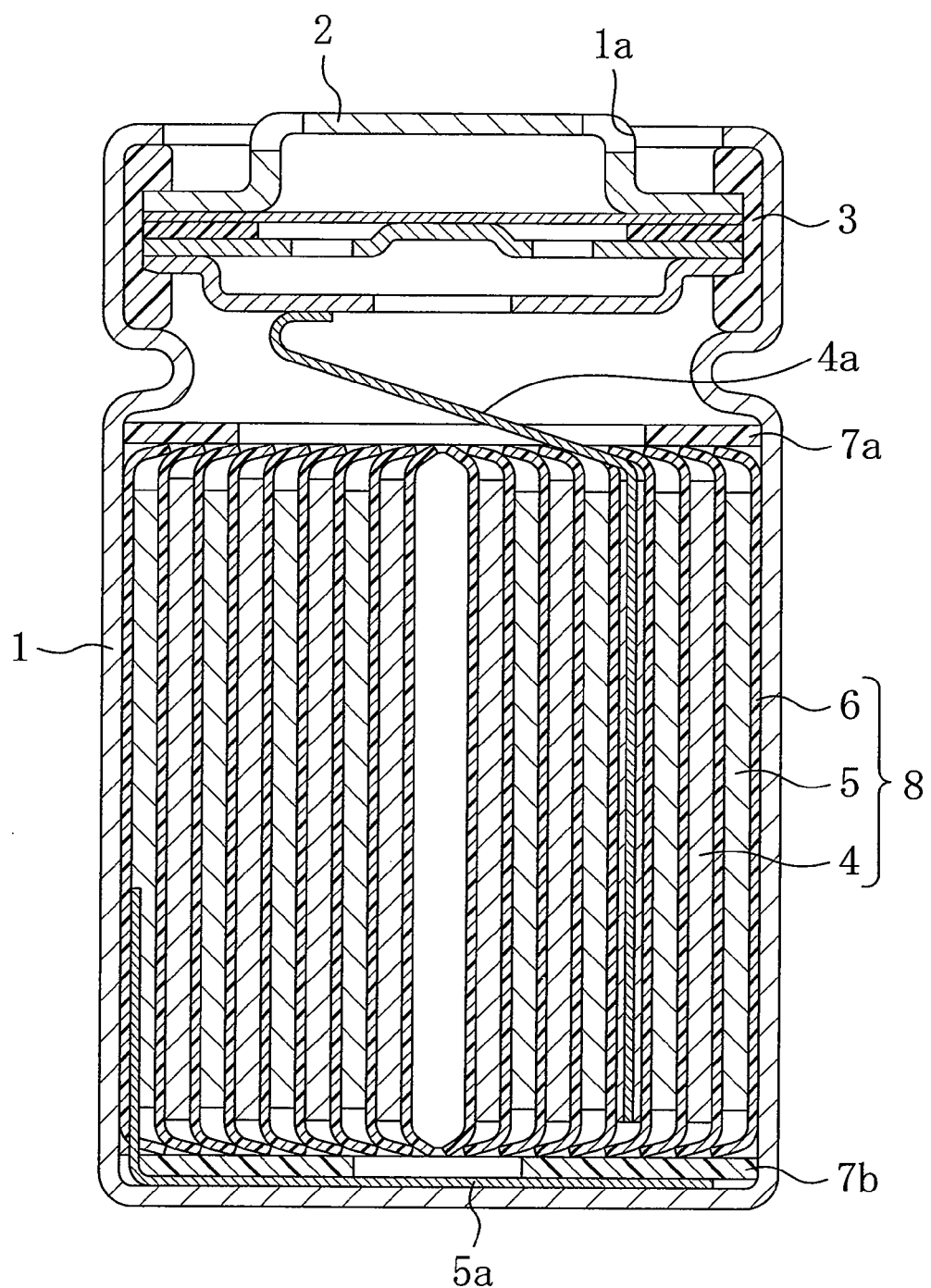
FIG. 1 is a cross-sectional view showing a configuration of a nonaqueous electrolyte secondary battery in accordance with one example embodiment of the present invention.

DESCRIPTION OF CHARACTERS 1 battery case
1a opening
2 sealing plate
3 gasket
4 positive electrode
4a positive electrode lead
4A positive electrode current collector
4B positive electrode mixture layer
5 negative electrode
5a negative electrode lead
5A negative electrode current collector
5B negative electrode mixture layer
6 separator (porous insulating layer)
7a upper insulating plate
7b lower insulating plate
8 electrode group

BEST MODE FOR CARRYING OUT THE INVENTION

The present inventors intensively examined factors in lowering the charge/discharge cycle characteristics in nonaqueous electrolyte secondary batteries having an increased charge end voltage of 4.3 V or higher (hereinafter simply referred to as a "battery"), and found the followings. As a charge/discharge cycle is repeated, a cross-sectional shape of a positive electrode becomes wavy. Accordingly, the distance between the positive electrode and a negative electrode cannot be uniform and become non-uniform over the entire region, thereby causing a non-uniform charge/discharge reaction. Thus, repetition of the charge/discharge cycle accompanies a decrease in battery capacity (i.e., lowering of the charge/discharge cycle characteristics).

One of the factors that cause a cross-sectional shape of the positive electrode to be wavy in association with repetition of the charge/discharge cycle can be assumed as follows. As the charge end voltage is increased, a degree of expansion of a positive electrode mixture layer by charge increases to generate a strain at the interface between the positive electrode mixture layer and a positive electrode current collector. As the charge/discharge cycle is repeated under the state where the strain is generated at the interface between the positive electrode mixture layer and the positive electrode current collector, a cross-sectional shape of the positive electrode becomes wavy.

As can be understood from the foregoing, in order to prevent lowering of the charge/discharge cycle characteristics of a nonaqueous electrolyte secondary battery having an increased charge end voltage of 4.3 V or higher, it is necessary to prevent a cross-sectional shape of a positive electrode from becoming wavy, which is caused by repetition of the charge/discharge cycle, and to take measures to prevent lowering of the charge/discharge cycle characteristics with respect to the positive electrode. In this sense, only measures to prevent lowering of the charge/discharge cycle characteristics with respect to the positive electrode active material as in the technique disclosed in Patent Document 1 cannot sufficiently prevent lowering of the charge/discharge cycle characteristics.

In view of this, the present inventors extensively examined measures to prevent lowering of the charge/discharge cycle characteristics with respect to the positive electrode, and found the followings. In a nonaqueous electrolyte secondary battery having an increased charge end voltage of 4.3 V or higher, when the tensile extension of the positive electrode is increased to 3.0% or more, lowering of the charge/discharge cycle characteristics can be prevented. This might be because, by increasing the tensile extension of the positive electrode to 3.0% or more, repetition of the charge/discharge cycle cannot cause a cross-sectional shape of the positive electrode to become wavy.

Further, by increasing the tensile extension of the positive electrode to 3.0% or more, even if the charge end voltage is increased, a strain is prevented from being generated at the interface between a positive electrode mixture layer and a positive electrode current collector. From this, it can be concluded that a cross-sectional shape of the positive electrode does not become wavy even if the charge/discharge cycle is repeated.

In view of this, the present invention attempts to prevent lowering of the charge/discharge cycle characteristics by increasing the tensile extension of a positive electrode to 3.0% or more in a nonaqueous electrolyte secondary battery having an increased charge end voltage of 4.3 V or higher.

Incidentally, one of the present applicants examined factors that cause a short circuit in a nonaqueous electrolyte secondary battery upon destruction by crush, and found that the followings. Of a positive electrode, a negative electrode, and a separator constituting an electrode group, the positive electrode, which has the lowest tensile extension, is broken first. Then, the broken portion of the positive electrode pierces through the separator, resulting in that the positive electrode and the negative electrode are short-circuited. In other words, a short circuit occurs in the battery.

In view of this, one of the present applicants examined a method for increasing the tensile extension of a positive electrode, and found that followings. When a positive electrode current collector obtained by rolling a positive electrode current collector having surfaces coated with dried positive electrode material mixture slurry is subjected to heat treatment at a temperature higher than the softening temperature of the positive electrode current collector, the tensile extension of the positive electrode can be increased.

In the description of Japanese Patent Application No. 2007-323217 (corresponding to PCT/JP2008/002114), one of the present applicants discloses, on the basis of the foregoing knowledge, a technique in which the tensile extension of a positive electrode is increased to a predetermined percentage or more for preventing a short circuit from occurring in a buttery destroyed by crush. In the technique disclosed in Japanese Patent Application No. 2007-323217, by increasing the tensile extension of the positive electrode to 3.0% or more, the positive electrode is not broken first upon destruction by crush of the battery, with a result that occurrence of a short circuit in the battery can be prevented.

Consideration will be given below to extension mechanisms when a positive electrode not subjected to heat treatment after rolling and a positive electrode subjected to heat treatment after rolling are pulled and extended.

When the positive electrode not subjected to heat treatment after rolling is pulled and extended, the positive electrode is broken at the same time when a large crack occurs in the positive electrode mixture layer. This might be caused by the following factor. As the positive electrode is extended, a tensile stress generated in the positive electrode mixture layer increases, and in turn, the increased tensile stress is applied to the positive electrode current collector. When a large crack occurs in the positive electrode mixture layer, the tensile stress applied to the positive electrode current collector concentrates on a portion where the large crack is formed. For this reason, the positive electrode current collector is broken at the same time when the crack occurs, and in turn, the positive electrode is broken.

On the other hand, when the positive electrode subjected to heat treatment after rolling is pulled and extended, the positive electrode continues to extend, while multiple minute cracks occur in the positive electrode mixture layer. Then, the positive electrode is broken. A factor of this might be the followings. The tensile stress applied to the positive electrode current collector is dispersed to portions where the multiple minute cracks occur. For this reason, occurrence of the cracks less influences the positive electrode current collector. Therefore, the positive electrode current collector cannot be broken at the same time when the cracks occur. Accordingly, the positive electrode continues to extend even after occurrence of the cracks. Then, when the magnitude of the dispersed tensile stress exceeds a given magnitude X, the positive electrode current collector is broken, and in turn, the positive electrode is broken. Here, the "given magnitude X" means a magnitude of a stress necessary for breaking a positive electrode current collector having surfaces on which positive electrode mixture layers are formed, in which multiple minute cracks are formed. For example, the "given magnitude X" is a magnitude approximate to a magnitude of a stress required when a positive electrode current collector is broken by pulling and extending only the positive electrode current collector.

In this way, since the extension mechanism when the positive electrode subjected to heat treatment after rolling is pulled and extended is different from that when the positive electrode not subjected to heat treatment after rolling is pulled and extended, the positive electrode subjected to heat treatment after rolling can have a tensile extension higher than the positive electrode not subjected to heat treatment after rolling.

Further, as can be understood from the above, the positive electrode is formed with the positive electrode current collector and the positive electrode mixture layers formed on opposite surfaces of the positive electrode current collector.

Hence, the tensile extension of the positive electrode is not limited by only the tensile extension of the positive electrode current collector.

In addition, one of the present applicants found that heat treatment for increasing the tensile extension of a positive electrode must be performed after rolling. Although heat treatment before rolling can increase the tensile extension of a positive electrode in the heat treatment, the tensile extension of the positive electrode decreases in the rolling thereafter. Hence, no increase in tensile extension of the positive electrode can be achieved in the end. It is noted that a technique has been proposed in which heat treatment is performed on either a positive electrode or a negative electrode at a temperature higher than the recrystallizing temperature of a binder and lower than the decomposition temperature of the binder, for example, before the positive and negative electrodes are stacked or wound with a porous insulating layer interposed therebetween for the purpose of suppressing peeling off of electrode materials from current collectors during the stacking or winding of the electrodes or suppressing a decrease in adhesiveness of the electrode materials to the current collectors (see Patent Document 2, for example).

One of the applicants further intensively studied on the heat treatment performed after rolling, and found the followings. If the heat treatment is performed at a high temperature and/or for a long time period, the high temperature and/or long time heat treatment can increase the tensile extension of the positive electrode to a given percentage or more. However, the binder, which is melted in the heat treatment, covers a positive electrode active material. This causes a novel problem of inviting a decrease in battery capacity.

In view of this, one of the present applicants extensively studied means for reducing the temperature and/or time period of the heat treatment, and found the followings. The use of a positive electrode current collector containing iron and mainly containing aluminum as a positive electrode current collector can reduce the temperature and/or time period of the heat treatment which are necessary for increasing the tensile extension of a positive electrode to a given percentage or more.

One of the present applicants discloses, in Japanese Patent Application No. 2007-323217, a technique of using a positive electrode current collector mainly containing aluminum and containing iron as a positive electrode current collector for increasing the tensile extension of a positive electrode to a given percentage or more and for suppressing covering of a positive electrode active material by a binder melted in heat treatment.

An example embodiment of the present invention will be described below with reference to the accompanying drawings.

(Example Embodiment)

Figure 2:
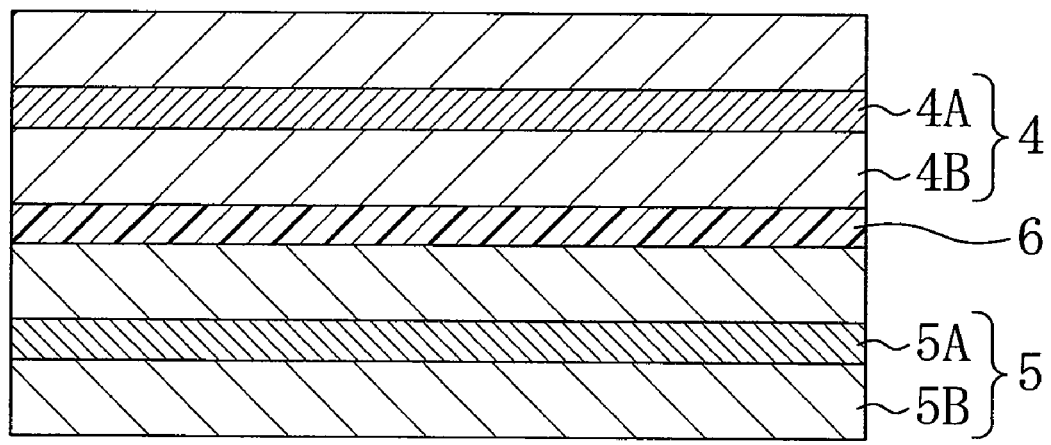
FIG. 2 is an enlarged cross-sectional view schematically showing a configuration of an electrode group of a nonaqueous electrolyte secondary battery in accordance with one example embodiment of the present invention.

A nonaqueous electrolyte secondary battery in accordance with one example embodiment of the present invention will be descried with reference FIGS. 1 and 2.

—Configuration of Nonaqueous Electrolyte Secondary Battery—

A nonaqueous electrolyte secondary battery in accordance with one example embodiment of the present invention will be descried with reference FIG. 1. FIG. 1 is a cross-sectional view showing a configuration of the nonaqueous electrolyte secondary battery in accordance with one example embodiment of the present invention.

As shown in FIG. 1, an electrode group 8, in which a positive electrode 4 and a negative electrode 5 are wound with a separator (a porous insulating layer) 6 interposed, is housed in a battery case 1 together with a nonaqueous electrolyte. An opening 1a of the battery case 1 is sealed by a sealing plate 2 through a gasket 3. A positive electrode lead 4a attached to the positive electrode 4 is connected to the sealing plate 2 serving also as a positive electrode terminal. A negative electrode lead 5a attached to the negative electrode 5 is connected to the battery case 1 serving also as a negative electrode terminal. An upper insulating plate 7a is placed on the upper end of the electrode group 8, and a lower insulating plate 7b is placed on the bottom end of the electrode group 8.

—Configuration of Electrode Group—

Description will be given with reference to FIG. 2 to a configuration of an electrode group of a nonaqueous electrolyte secondary battery in accordance with one embodiment of the present invention. FIG. 2 is an enlarged cross-sectional view schematically showing the configuration of the electrode group of the nonaqueous electrolyte secondary battery in accordance with one embodiment of the present invention.

As shown in FIG. 2, positive electrode mixture layers 4B are formed on opposite sides of a positive electrode current collector 4A. Negative electrode mixture layers 5B are formed on opposite sides of a negative electrode current collector 5A. The separator 6 is interposed between the positive electrode 4 and the negative electrode 5.

The positive electrode 4 is a positive electrode subjected to heat treatment after rolling. The tensile extension of the positive electrode 4 is equal to or higher than 3.0%.

The nonaqueous electrolyte secondary battery has a charge end voltage of 4.3 V or higher in normal operation.

The positive electrode current collector 4A contains iron and mainly contains aluminum. The amount of the iron contained in the positive electrode current collector 4A is preferably equal to or higher than 1.20 wt % and equal to or lower than 1.70 wt %. The positive electrode current collector "containing iron and mainly containing aluminum" herein is a positive electrode current collector containing iron as an accessory component and containing aluminum as a primary component, of which amount is greater than that of iron.

The tensile extension of the negative electrode 5 is 3.0% or higher, and the tensile extension of the separator 6 is 3.0% or higher.

The "tensile extension" herein is an extension ratio of a positive electrode extended immediately before being broken with respect to the positive electrode before being extended. A specific method for measuring the tensile extension is as follows, for example. A sample positive electrode of 15 mm wide and 20 mm long is formed out of a positive electrode. One end of the sample positive electrode is pulled along the length of the sample positive electrode at a speed of 20 mm/min with the other end thereof fixed. Then, the length of the sample positive electrode immediately before the sample positive electrode is broken is measured. Using the length of the sample positive electrode before the extension (i.e., 20 mm) and the length of the sample positive electrode immediately before the breakage, the tensile extension is calculated.

It is noted that the positive electrode mixture layer 4B constituting the positive electrode 4 contains a positive electrode active material, a binder, a conductive agent, and the like. Known materials can be used as respective materials of the positive electrode active material, the binder, and the conductive agent. For example, the same materials as those disclosed in the description of Japanese Patent Application No. 2007-323217 can be used. As a material of the negative electrode current collector 5A constituting the negative electrode 5, known materials can be used. For example, the material may be copper, stainless steel, nickel, and the like. The negative electrode mixture layer 5B constituting the negative electrode 5 contains a negative electrode active material, a binder, a conductive agent, and the like. As a material of the negative electrode active material, known materials can be used. For example, the same materials as those disclosed in the description of Japanese Patent Application No. 2007-323217 can be used. Further, known materials can be used as a material of the separator 6. For example, the same materials as those disclosed in the description of Japanese Patent Application No. 2007-323217 can be used. In addition, known materials can be used as materials of a nonaqueous solvent, an electrolyte, and the like contained in the nonaqueous electrolyte. For example, the same materials as those disclosed in the description of Japanese Patent Application No. 2007-323217 can be used.

One nonaqueous electrolyte secondary battery fabricating method in accordance with an example embodiment of the present invention will be described below with reference to FIG. 1.

—Formation of Positive Electrode—

First, positive electrode material mixture slurry containing a positive electrode active material, a binder, and a conductive agent is prepared. Then, this positive electrode material mixture slurry is applied onto the surfaces of a positive electrode current collector, and is dried. Thereafter, the resultant positive electrode current collector coated with the dried positive electrode material mixture slurry is rolled, thereby forming a positive electrode plate having a predetermined thickness. Subsequently, the positive electrode plate (that is, the positive electrode current collector coated with the dried positive electrode material mixture slurry) is subjected to heat treatment at a given temperature. Next, the positive electrode plate is cut to have predetermined width and length, thereby forming a positive electrode having the predetermined thickness, width, and length.

The given temperature herein is higher than the softening temperature of the positive electrode current collector. Further, the given temperature is preferably lower than the decomposition temperature of the binder.

—Formation of Negative Electrode—

Negative electrode material mixture slurry containing a negative electrode active material, a binder, and the like is prepared first. Then, this negative electrode material mixture slurry is applied onto the surfaces of a negative electrode current collector, and is dried. Thereafter, the resultant negative electrode current collector coated with the dried negative electrode material mixture slurry is rolled, thereby forming a negative electrode plate having a predetermined thickness. Next, the negative electrode plate is cut to have predetermined width and length, thereby forming a negative electrode having the predetermined thickness, width, and length.

—Fabrication of Battery—

As illustrated in FIG. 1, a positive electrode lead 4a is attached to a positive electrode current collector (see 4A in FIG. 2), and a negative electrode lead 5a is attached to a negative electrode current collector (see 5A in FIG. 2). Then, a positive electrode 4 and a negative electrode 5 are wound with a separator 6 interposed therebetween, thereby forming an electrode group 8. Thereafter, an upper insulating plate 7a is placed on the upper end of the electrode group 8, and a lower insulating plate 7b is placed on the bottom end of the electrode group 8. Subsequently, the negative electrode lead 5a is welded to a battery case 1, and the positive electrode lead 4a is welded to a sealing plate 2, thereby housing the electrode group 8 in a battery case 1. Then, a nonaqueous electrolyte is poured into the battery case 1. Lastly, an opening 1a of the battery case 1 is sealed by a sealing plate 2 through a gasket 3, thereby completing a battery.

In the present example embodiment, the tensile extension of the positive electrode is increased to 3.0% or more. Accordingly, repetition of a charge/discharge cycle cannot cause a cross-sectional shape of the positive electrode to become wavy. Hence, the distance between the positive electrode and the negative electrode can be kept uniformly over the entire region to uniform a charge/discharge reaction. This can cause no decrease in battery capacity even if the charge/discharge cycle is repeated, with a result that lowering of the charge/discharge cycle characteristics can be prevented.

Further, since a positive electrode having a tensile extension increased to 3.0% or more is used as a positive electrode, even when the battery is destroyed by crush, the positive electrode is not broken first, thus suppressing occurrence of a short circuit in the battery.

Particularly, upon occurrence of a short circuit in a battery, thermal energy generated at the short circuit increases as the charge end voltage is increased, thereby increasing a possibility of excessive heating. Specifically, since the thermal energy generated at a short circuit in a battery having a charge end voltage of 4.3 V or higher is greater than that in a general battery (for example, a battery having a charge end voltage of 4.2 V), the possibility of excessive heating is high. For this reason, prevention of occurrence of a short circuit in a battery having a charge end voltage of 4.3 V or higher can significantly reduce the possibility of excessive heating.

Here, the tensile extensions of the negative electrode 5 and the separator 6 are preferably equal to or higher than 3.0%, similarly to the positive electrode 4. The reason thereof is as follows. First, for example, in the case where the tensile extension of a negative electrode is below 3.0%, even if the tensile extensions of a positive electrode and a separator are 3.0% or higher, the negative electrode is broken first when the battery is destroyed by crush, thereby causing a short circuit in the battery. Second, for example, in the case where the tensile extension of a separator is below 3.0%, even if the tensile extensions of a positive electrode and a negative electrode are 3.0% or higher, the separator is broken first when the battery is destroyed by crush, thereby causing a short circuit in the battery.

Furthermore, the use of a positive electrode current collector containing iron and mainly containing aluminum as a positive electrode current collector can reduce the temperature and/or time period of heat treatment necessary for increasing the tensile extension of a positive electrode to 3.0% or more. This can suppress covering of a positive electrode active material by a binder melted in the heat treatment performed after rolling.

As a concrete example, the present example embodiment describes, but is not limited to, the case where a positive electrode current collector containing iron and mainly containing aluminum is used as a positive electrode current collector for the purpose of suppressing covering of a positive electrode active material by a binder melted in the heat treatment. Alternatively, a positive electrode current collector containing, for example, high purity aluminum and no iron may be used as a positive electrode current collector.

Further, the present example embodiment describes as a concrete example the case where the electrode group 8 in which the positive electrode 4 and the negative electrode 5 are wound with the separator 6 interposed is used as an electrode group, as shown in FIG. 1, but the present invention is not limited thereto. For example, an electrode group in which a positive electrode and a negative electrode are stacked with a separator interposed may be used as an electrode group.

As already described, the advantage that occurrence of a short circuit in a battery destroyed by crush can be prevented is expressly referred to as an advantage that the invention can attain besides the advantage of attaining the objective of the present invention. Still other advantages may be prevention of occurrence of a short circuit in a battery in which foreign matter enters, prevention of a positive electrode from being cut in winding (or stacking) the positive electrode and a negative electrode with a separator interposed, and the like.

In the present invention, the lower limit of the range of the charge end voltage is set to 4.3 V, while no upper limit is set. The upper limit may be 4.5 V, for example. The reason thereof is as follows. If the charge end voltage is increased to 4.3 V or higher and 4.5 V or lower, the battery capacity can be increased effectively. In contrast, if the charge end voltage is increased to more than 4.5 V, it is difficult to effectively increase the battery capacity.

Table 1 below shows the relationship between the tensile extensions of positive electrodes and a short circuit occurring in batteries destroyed by crush. Table 1 indicates the tensile extensions of the positive electrodes and results of crush test (i.e., depths at which a short circuit occurs) in Batteries 1 to 5.

Batteries 1 to 4 are batteries using, as positive electrode current collectors, positive electrodes current collector containing iron and mainly containing aluminum, and subjected to, after rolling, heat treatment at the same temperature (specifically, 280° C.) for different time periods (Battery 1: 10 seconds, Battery 2: 20 seconds, Battery 3: 120 seconds, and Battery 4: 180 seconds). On the other hand, Battery 5 is a battery using, as a positive electrode current collector, a positive electrode current collector containing iron and mainly containing aluminum and not subjected to heat treatment after rolling.

TABLE 1

|  | Current collector | Heat treatment conditions (° C./sec) | Tensile extension (%) | Depth at short circuit |
|---|---|---|---|---|
| Battery 1 | A8021 | 280/10 | 3.0 | 8 |
| Battery 2 | A8021 | 280/20 | 5.0 | 9 |
| Battery 3 | A8021 | 280/120 | 6.0 | 10 |
| Battery 4 | A8021 | 280/180 | 6.5 | 10 |
| Battery 5 | A8021 | no | 1.5 | 5 |

As indicated in Table 1, while the tensile extension of the positive electrode of Battery 5 not subjected to heat treatment after rolling is 1.5%, the tensile extensions of the positive electrodes of Batteries 1 to 4 subjected to heat treatment after rolling can be increased to 3.0% or more (Battery 1: 3.0%, Battery 2: 5.0%, Battery 3: 6.0%, and Battery 4: 6.5%).

As indicated in Table 1, while the depth at which a short circuit occurs in Battery 5 not subjected to heat treatment after rolling is 5 mm, the depths at which a short circuit occurs in Batteries 1 to 4 subjected to heat treatment after rolling can be increased to 8 mm or more (Battery 1: 8 mm, Battery 2: 9 mm, Battery 3: 10 mm, and Battery 4: 10 mm).

As can be understood from Table 1, heat treatment after rolling can increase the tensile extension of a positive electrode to 3.0% or more, thereby preventing a short circuit from occurring in a battery destroyed by crush.

The methods for fabricating Batteries 1 to 5 are as follows.

(Battery 1)

(Formation of Positive Electrode)

First, $LiNi_{0.82}Co_{0.15}Al_{0.03}O_2$ having an average particle size of 10 μm was prepared.

Next, 4.5 vol % of acetylene black as a conductive agent with respect to 100.0 vol % of the positive electrode active material, a solution in which 4.7 vol % of polyvinylidene fluoride (PVDF) as a binder with respect to 100.0 vol % of the positive electrode active material was dissolved in a N-methylpyrrolidone (NMP) solvent, and $LiNi_{0.82}Co_{0.15}Al_{0.03}O_2$ as a positive electrode active material were mixed, thereby obtaining positive electrode material mixture slurry. This positive electrode material mixture slurry was applied onto opposite sides of aluminum foil (A8021H-H18-15RK) produced by NIPPON FOIL MFG CO., LTD. and having a thickness of 15 μm as a positive electrode current collector, and was dried. Thereafter, the resultant positive electrode current collector whose both surfaces were coated with the dried positive electrode material mixture slurry was rolled, thereby obtaining a positive electrode plate in the shape of a plate having a thickness of 0.157 mm. This positive electrode plate was then subjected to heat treatment at 280° C. for 10 seconds by using hot air subjected to low humidity treatment at −30° C. Subsequently, the positive electrode plate was cut to have a width of 57 mm and a length of 564 mm, thereby obtaining a positive electrode having a thickness of 0.157 mm, a width of 57 mm, and a length of 564 mm.

(Formation of Negative Electrode)

First, flake artificial graphite was ground and classified to have an average particle size of about 20 μm.

Then, 3 parts by weight of styrene butadiene rubber as a binder and 100 parts by weight of an aqueous solution as a binder containing 1 wt % of carboxymethyl cellulose were added to 100 parts by weight of flake artificial graphite as a negative electrode active material, and these materials were mixed, thereby preparing negative electrode material mixture slurry. This negative electrode material mixture slurry was then applied onto opposite sides of copper foil with a thickness of 8 μm as a negative electrode current collector, and was dried. Thereafter, the resultant negative electrode current collector whose both surfaces were coated with the dried negative electrode material mixture slurry was rolled, thereby obtaining a negative electrode plate in the shape of a plate having a thickness of 0.156 mm. This negative electrode plate was subjected to heat treatment with hot air in a nitrogen atmosphere at 190° C. for 8 hours. The negative electrode plate was then cut to have a width of 58.5 mm and a length of 750 mm, thereby obtaining a negative electrode having a thickness of 0.156 mm, a width of 58.5 mm, and a length of 750 mm. The tensile extension of the negative electrode thus obtained was 5.0%, i.e., 3.0 or higher.

(Preparation of Nonaqueous Electrolyte)

To a solvent mixture of ethylene carbonate and dimethyl carbonate in a volume ratio of 1:3 as a nonaqueous solvent, 5 wt % of vinylene carbonate was added as an additive for increasing charge/discharge efficiency of a battery, and $LiPF_6$ was dissolved as an electrolyte so as to have a mole concentration of 1.4 mol/m³ with respect to the nonaqueous solvent, thereby obtaining a nonaqueous electrolyte.

(Fabrication of Cylindrical Battery)

First, a positive electrode lead made of aluminum was attached to the positive electrode current collector, and a negative electrode lead made of nickel was attached to the negative electrode current collector. Then, the positive electrode and the negative electrode were wound with a polyethylene separator (a separator having a tensile extension of 8% (i.e., 3.0% or higher)) interposed therebetween, thereby forming an electrode group. Thereafter, an upper insulating plate was placed on the upper end of the electrode group, and a lower insulating plate was placed on the bottom end of the electrode group. Subsequently, the negative electrode lead was welded to a battery case, and the positive electrode lead was welded to a sealing plate including a safety valve operated with inner pressure, thereby housing the electrode group in the battery case. Then, the nonaqueous electrolyte was poured in the battery case under reduced pressure. Lastly, an opening of the battery case was sealed by the sealing plate through a gasket, thereby completing a battery.

The battery including the positive electrode subjected to heat treatment at 280° C. (i.e., a temperature higher than the softening temperature of the positive electrode current collector) for 10 seconds in the foregoing manner is hereinafter referred to as Battery 1.

(Battery 2)

A battery was fabricated in the same manner as for Battery 1 except that the positive electrode plate of the battery was subjected to heat treatment at 280° C. for 20 seconds in (Formation of positive electrode), and is referred to as Battery 2.

(Battery 3)

A battery was fabricated in the same manner as for Battery 1 except that the positive electrode plate of the battery was subjected to heat treatment at 280° C. for 120 seconds in (Formation of positive electrode), and is referred to as Battery 3.

(Battery 4)

A battery was fabricated in the same manner as for Battery 1 except that the positive electrode plate of the battery was subjected to heat treatment at 280° C. for 180 seconds in (Formation of positive electrode), and is referred to as Battery 4.

(Battery 5)

A battery was fabricated in the same manner as for Battery 1 except that no heat treatment was performed on the positive electrode plate of the battery after rolling in (Formation of positive electrode), and is referred to as Battery 5.

The method of measuring the tensile extension of a positive electrode is as follows.

<Measurement of Tensile Extension of Positive Electrode>

First, each of Batteries 1 to 5 was disassembled, and the positive electrode was taken out. This positive electrode was then cut to have a width of 15 mm and a length of 20 mm, thereby forming a sample positive electrode. Thereafter, one end of the sample positive electrode was fixed, and the other end of the sample positive electrode was extended along the length of the sample positive electrode at a speed of 20 mm/min. At this time, the length of the sample positive electrode immediately before the sample positive electrode was broken was measured. Using the obtained length and the length (i.e., 20 mm) before the extension of the sample positive electrode, the tensile extension of the positive electrode was calculated.

The method of measuring the depth at which a short circuit occurs in the crush test is as follows.

<Crush Test>

Subsequent to charging each of Batteries 1 to 5 at a battery temperature of 30° C., a round stick having a diameter of 6 mm was made to come in contact with the battery and was moved in the depth direction of the battery at a speed of 0.1 mm/sec to break the battery. Thereafter, the amount of deformation in the depth direction when a short circuit occurs (i.e., the depth at which a short circuit occurs) in the battery destroyed by the crush was obtained.

INDUSTRIAL APPLICABILITY

The present invention can prevent lowering of the charge/discharge cycle characteristics, and is therefore useful in nonaqueous electrolyte secondary batteries having an increased charge end voltage of 4.3 V or higher and methods for fabricating such batteries.

The invention claimed is:

1. A nonaqueous electrolyte secondary battery, comprising:
a positive electrode including a positive electrode current collector and a positive electrode mixture layer including a positive electrode active material and a binder, the positive electrode mixture layer being provided on the positive electrode current collector;
a negative electrode;
a porous insulating layer interposed between the positive electrode and the negative electrode; and
a nonaqueous electrolyte, wherein:
a tensile extension of the positive electrode in a state in which the positive electrode mixture layer is formed on the positive electrode current collector is equal to or higher than 3.0% and 6.5% or less,
a charge end voltage in normal operation is equal to or higher than 4.3 V and equal to or lower than 4.5V,
the positive electrode current collector is made of aluminum containing iron, and
a content of the iron contained in the positive electrode current collector is equal to or higher than 1.20 wt % and equal to or lower than 1.70 wt %.

2. The battery of claim 1, wherein
a tensile extension of the negative electrode is equal to or higher than 3.0% and 5.0% or less, and
a tensile extension of the porous insulating layer is equal to or higher than 3.0% and 8.0% or less.

3. The battery of claim 1, wherein the positive electrode is obtained by rolling and then performing heat treatment at a predetermined temperature on the positive electrode current collector, where positive electrode material mixture slurry containing the positive electrode active material is applied to the positive electrode current collector and is dried.

* * * * *